US011456544B2

(12) United States Patent
Gonzalez et al.

(10) Patent No.: US 11,456,544 B2
(45) Date of Patent: Sep. 27, 2022

(54) MULTIBAND ANTENNA ARRAY WITH MASSIVE MULTIPLE INPUT MULTIPLE OUTPUT ARRAY

(71) Applicant: Huawei Technologies Co., Ltd., Shenzhen (CN)

(72) Inventors: Ignacio Gonzalez, Munich (DE); Christoph Spranger, Munich (DE); Bruno Biscontini, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 16/817,140

(22) Filed: Mar. 12, 2020

(65) Prior Publication Data

US 2020/0212600 A1  Jul. 2, 2020

Related U.S. Application Data

(63) Continuation of application No. PCT/EP2017/072861, filed on Sep. 12, 2017.

(51) Int. Cl.
*H01Q 21/30* (2006.01)
*H01Q 1/24* (2006.01)
*H04B 7/0413* (2017.01)
*H04B 7/06* (2006.01)

(52) U.S. Cl.
CPC ............ *H01Q 21/30* (2013.01); *H01Q 1/243* (2013.01); *H04B 7/0413* (2013.01); *H04B 7/0617* (2013.01)

(58) Field of Classification Search
CPC ...... H01Q 21/30; H01Q 1/243; H04B 7/0413; H04B 7/0617
USPC ...................................................... 343/700 R
See application file for complete search history.

(56) References Cited

U.S. PATENT DOCUMENTS

| 6,351,243 | B1 | 2/2002 | Derneryd et al. |
| 7,050,005 | B2 | 5/2006 | Göttl et al. |
| 7,079,083 | B2 | 7/2006 | Gottl et al. |
| 9,231,676 | B2 | 1/2016 | Zirwas et al. |
| 9,293,809 | B2 | 3/2016 | Teillet et al. |
| 2007/0273603 | A1 | 11/2007 | Svensson et al. |
| 2012/0280880 | A1 | 11/2012 | Arvidsson et al. |

(Continued)

FOREIGN PATENT DOCUMENTS

| CN | 1886864 A | 12/2006 |
| CN | 102694275 A | 9/2012 |

(Continued)

OTHER PUBLICATIONS

Efficient Coordinated Recovery of Sparse Channels in Massice MIMO, IEEE transactions on signal processing,vol. 63, Jan. 1, 2015. pp. 104-118.*

(Continued)

*Primary Examiner* — Peguy Jean Pierre
(74) *Attorney, Agent, or Firm* — Leydig Voit & Mayer Ltd.

(57) ABSTRACT

An antenna that is suitable for multiband operation. The antenna includes a plurality of first radiating elements configured to radiate in a first frequency band. The first radiating elements are arranged in a sparse mMIMO array. The antenna further includes a plurality of second radiating elements configured to radiate in a second frequency band lower than the first frequency band. The second radiating elements are arranged in an array at least partially overlapping with the sparse array. At least some of the second radiating elements are disposed in an area covered by the sparse mMIMO array.

19 Claims, 8 Drawing Sheets

(56) References Cited

U.S. PATENT DOCUMENTS

| | | | |
|---|---|---|---|
| 2013/0050022 A1 | 2/2013 | Feger et al. | |
| 2013/0285852 A1 | 10/2013 | Teillet | |
| 2015/0357721 A1 | 12/2015 | Zimmerman et al. | |
| 2017/0294704 A1* | 10/2017 | Sun | H01Q 21/062 |
| 2018/0034527 A1* | 2/2018 | Noh | H04B 7/0417 |
| 2018/0261929 A1 | 9/2018 | Biscontini et al. | |
| 2020/0044362 A1* | 2/2020 | Song | H01Q 19/10 |
| 2020/0067205 A1 | 2/2020 | Segador Alvarez et al. | |
| 2021/0083397 A1* | 3/2021 | Göttl | H01Q 5/40 |

FOREIGN PATENT DOCUMENTS

| | | |
|---|---|---|
| CN | 102832455 A | 12/2012 |
| CN | 103560337 A | 2/2014 |
| CN | 104269649 A | 1/2015 |
| CN | 204857971 U | 12/2015 |
| CN | 106170890 A | 11/2016 |
| CN | 106229638 A | 12/2016 |
| CN | 106410396 A | 2/2017 |
| EP | 1525642 B1 | 6/2016 |
| WO | 2013092908 A1 | 6/2013 |
| WO | 2016173633 A1 | 11/2016 |
| WO | 2018010817 A1 | 1/2018 |

OTHER PUBLICATIONS

Cenanovic et al., "Sparse MIMO Array for Multi-Angle Reflection Ellipsometry," 2012 IEEE International Conference on Wireless Information Technology and Systems (ICWITS), total 4 pages (Jan. 24, 2013).

\* cited by examiner

MULTIBAND ANTENNA ARRAY WITH MASSIVE MULTIPLE INPUT MULTIPLE OUTPUT ARRAY

CROSS-REFERENCE TO RELATED APPLICATIONS

This application is a continuation of International Application No. PCT/EP2017/072861, filed on Sep. 12, 2017, the disclosure of which is hereby incorporated by reference in its entirety.

FIELD

The present invention relates to a new antenna structure. In particular, the disclosure relates to a multiband antenna, i.e. to an antenna that is configured for operation in at least two frequency bands. The disclosure presents a multiband antenna with a massive Multiple Input Multiple Output (mMIMO) array and at least one antenna array.

BACKGROUND

With the Long Term Evolution (LTE) rollout almost complete, operators now need to prepare their networks for the upcoming 5G mobile communications standard. One of the key technologies to enable this new generation of mobile communications is mMIMO below a frequency of 6 GHz. Therefore, antenna vendors are requested to develop new antennas that support mMIMO.

In particular, in order to reduce the number of antennas in-site and accordingly to save space, new antennas that support both mMIMO and conventional frequency bands are requested. Reducing the number of antennas would mean strongly simplifying the overall deployment process of mMIMO antennas and traditional antennas, respectively. Consequently, both the associated operating expenditures (OPEX) and capital expenditures (CAPEX) could be reduced.

Apart from the advantageous MIMO capabilities of mMIMO, an increase of the number of ports would also enable very interesting scenarios, like site sharing, according to which an antenna is shared between at least two different operators. Site sharing would further significantly reduce the OPEX.

In addition, new bands like the supplementary downlink (SDL) or the L-Band (1.427-1.52 GHz) are being currently auctioned, and are already licensed in several countries. Therefore, new antenna should preferably support especially these new bands. To cover the standard operating bands in modern base station antenna systems, adding newer frequencies, new concepts, and new architectures different from the legacy technology must be developed.

For the above-mentioned reasons, especially the integration of a mMIMO antenna array with one or further antenna arrays on a single antenna is highly desired, preferably without increasing the size of conventional antennas. For commercial field deployment, especially the antenna height is often a dominating limiting factor. Therefore, a new integrated antenna with reduced antenna height would mean a significant simplification of the overall deployment process. Additionally, in order to facilitate site acquisitions, and to fulfill local regulations regarding site upgrades, also the antenna width of the new integrated antenna should be at least comparable to legacy products. Moreover, in order to be able to maintain the mechanical support structures already existing in the sites, also the wind load of the new integrated antenna should be equivalent to the ones of legacy products.

However, the integration of a mMIMO antenna array and one or more antenna arrays on a single antenna typically leads to a highly complex antenna, which negatively influences the antenna size. Accordingly, it is very challenging to meet the above-mentioned strict limitations in antenna height and width for a new integrated antenna.

Currently there is no conventional solution for integrating a mMIMO antenna array with at least one further antenna array on a single antenna.

SUMMARY

In view of the above-mentioned challenges and disadvantages, the disclosure improves conventional antennas. The present disclosure provides an antenna that integrates a mMIMO array with at least one further antenna array, while it maintains the very strict limitations set on the antenna height and width. In particular, the integrated antenna, of the present disclosure, does not have a larger size than a conventional antenna. Further, the antenna, of the present disclosure, has the same, or an even better performance, than independently a conventional mMIMO antenna and a conventional antenna, respectively.

Further, specifically an integrated multiband antenna for operating on more than two frequency bands is desired, especially an antenna with two high band (HB) arrays, one mid band (MB) array, and a mMIMO array. The dimensions of such an antenna should not exceed a width of 390 mm, a length of 1500 mm, and a depth of 50 mm. The antenna should further specifically allow having 2×4T4R (1.8G and 2.6G)+2T2R (2.1G)+L-Band support and a full 64 TRX mMIMO functionality.

In particular, the disclosure provides for the combination of a sparse mMIMO array and at least one other antenna array, in order to build a new integrated antenna.

For this disclosure, a sparse antenna array is an array of radiating elements, in which the space that is not occupied by the radiating elements of the array (available space) is increased compared to a comparable non-sparse (or full) antenna array, without decreasing the effective aperture compared to said non-sparse antenna array. "Comparable array" thereby means that the two arrays have a similar effective antenna aperture, and, for instance, that the two arrays cover the same area and/or have a similar amount of radiating elements. For example, compared to the comparable non-sparse array, some of the radiating elements may be eliminated to obtain the sparse array. That is, the available space is increased by generating space between at least some of the radiating elements. As another example, compared to the comparable non-sparse array, a spacing between at least some of the radiating elements may be increased to obtain the sparse array. That is, the available space is increased by providing larger distances between some radiating elements.

Hence, an example of a sparse array is an array of a given aperture, which has less radiating elements than a uniform non-sparse (full) array having a comparable aperture. In a uniform array, the radiating elements are arranged strictly with a uniform spacing, and the uniformity requirement limits significantly the number of allowed placement positions for the radiating elements. As already mentioned, a sparse array can, for instance, be obtained by removing radiating elements from such uniform non-sparse array.

An aspect of the disclosure provides an antenna, having a plurality of first radiating elements configured to radiate in a first frequency band, the first radiating elements being arranged in a sparse massive mMIMO array; and having a plurality of second radiating elements configured to radiate in a second frequency band lower than the first frequency band, the second radiating elements being arranged in an array at least partially overlapping with the sparse array so that at least some of the second radiating elements are disposed in an area covered by the sparse array.

The use of the sparse array for the mMIMO functionality of the antenna allows positioning some of the second radiating elements of the further array, which is preferably a passive or at least non-mMIMO antenna array, in between the first radiating elements. In this way, the two arrays are integrated on the antenna without increasing the antenna size compared to a conventional antenna. In particular, the above-described strict limitations on antenna height and width can be fulfilled.

The use of the sparse array allows an optimal integration of the different radiating elements of the at least two arrays. Thereby, the advantages of an integrated antenna can be employed. That is, the number of antennas in-site can be reduced in comparison with using individually a conventional mMIMO antenna and a conventional passive antenna.

While the use of the sparse array increases the available space, and is therefore advantageous for a tighter integration of the two arrays, it nevertheless shows an equal performance compared to a comparable conventional non-sparse array. Even if the sparse array is obtained by reducing the number of the first radiating elements compared to a comparable non-sparse array, its directivity level is more or less the same, its Side Lobe Level (SLL) in the azimuth cuts is decreased only slightly, and grating lobe performance for the elevation cut is even improved. The use of the sparse array additionally allows increasing a spacing between the second radiating elements of the further array, when compared to integrating the further array e.g. side-by-side with a non-sparse array, thus improving the performance of the further array.

Further pluralities of third, fourth, . . . nth radiating elements, which respectively operate in third, fourth, . . . nth frequency bands and are preferably arranged in a third, fourth, . . . nth antenna array, are possible.

In an implementation form of the aspect, the sparse array includes first radiating elements arranged along the longitudinal direction of the antenna in a plurality of columns separated along the lateral direction of the antenna. At least one of the plurality of columns of the first radiating elements includes less first radiating elements than the other columns of the first radiating elements.

Accordingly, the available space is increased by creating space in the columns including less first radiating elements. This allows integrating the sparse array with the array of second radiating elements without increasing the overall antenna size.

In a further implementation form of the aspect, the sparse array includes first radiating elements arranged along the longitudinal direction of the antenna in a plurality of columns separated along the lateral direction of the antenna. At least in one of the columns, a spacing of the first radiating elements is non-uniform.

The non-uniform spacing provides space to increase the available space in the sparse mMIMO array. This allows integrating it with the array of second radiating elements without increasing the overall antenna size.

In a further implementation form of the aspect, the at least one column with the non-uniform spacing of the first radiating elements includes adjacent first radiating elements separated by a smaller spacing and adjacent first radiating elements separated by a larger spacing. At least one of the second radiating elements is arranged in the larger spacing of the first radiating elements.

The larger spacings allow the placement of at least some of the second radiating elements. This allows integrating the mMIMO array and the further array without increasing the overall antenna size.

In a further implementation form of the aspect, a spacing of the first radiating elements in columns overlapping with the array of the second radiating elements is non-uniform, and/or a spacing of the first radiating elements in columns not overlapping with the array of the second radiating elements is uniform.

The term "A and/or B" in the document shall be understood as "at least one of A and B".

This achieves a mMIMO array that is integrated with the array of second radiating elements without sacrificing on the performance of the mMIMO array, when compared to a comparable stand-alone mMIMO array of a conventional antenna.

In a further implementation form of the aspect, at least 70% of the sparse array is arranged in a center area of the antenna.

The center area of the antenna is a certain area located in the middle of the antenna in its longitudinal direction. A heavy Radio Frequency (RF) module is usually attached to any mMIMO array at the back side of the antenna. The arrangement of the sparse array in the center area thus improves the mechanical properties of the antenna (weight, strengths, etc.) of the disclosure.

In a further implementation form of the aspect, the second radiating elements disposed in the area covered by the sparse array are arranged interleaved with the first radiating elements.

This enables integrating the two arrays without loss of antenna performance.

In a further implementation form of the aspect, a spacing of the second radiating elements disposed in the area covered by the sparse array is uniform.

The uniform spacing of the second radiating elements can be increased compared to, e.g. a side-by-side placement of the two arrays, namely by the use of the sparse array integrating with the further array. Consequently, the performance of the further array is improved. Preferably, the array of second radiating elements is either a HB array (1700-2700 MHz) or a MB array (1400-2200 MHz).

In a further implementation form of the aspect, the second radiating elements are arranged along the longitudinal direction of the antenna in a column at least partially overlapping with the sparse array.

A column-like array provides for the best overall antenna performance.

In a further implementation form of the aspect, the column of the second radiating elements is divided into two second radiating elements on at least one position preferably on one of its ends. The two radiating elements are arranged at the same position with respect to the longitudinal direction of the antenna, but are separated along the lateral direction of the antenna.

The two radiating elements can be used to produce a combined radiation pattern with a thinner horizontal beam width. When the full array of second radiating elements is excited, the total horizontal beam width can thus be reduced compared to a column of radiating elements only.

In a further implementation form of the aspect, the plurality of the second radiating elements includes first-type and second-type second radiating elements, and the first-type second radiating elements are arranged in the area covered by the sparse array and the second-type second radiating elements are arranged outside of the area covered by the sparse array.

For instance, the first-type second radiating elements may be dedicated low profile and/or low shadowing radiating elements. Low profile means that the height of the radiating element is smaller than 0.15λ, wherein λ is the wavelength of the frequency band of the radiating element. Low shadowing means that the radiating element, when integrated with the first radiating elements, does not shadow the first radiating elements or at least causes only a minimized shadowing effect. For instance, so called VH dipoles (explained in more detail further below) have such low profile and/or low shadowing characteristics, and improve the performance of the antenna given the strict antenna size limitations. In comparison, the second-type second radiating elements may be conventional radiating elements, like disc dipoles, e.g. flat dipoles, which are printed on a PCB. The use of the different types of second radiating elements further provides the correct horizontal beam width.

In a further implementation form of the aspect, the antenna further includes a plurality of third radiating elements configured to radiate in a third frequency band lower than the first frequency band. The third radiating elements are arranged in at least one further array at least partially overlapping the sparse array so that at least some of the third radiating elements are disposed in the area covered by the sparse array.

Accordingly, an antenna with coexisting antenna arrays for operation in up to three frequency bands is provided. Each array thereby shows a similar performance than the same conventional stand-alone array. The sparse array can be designed to optimally integrate both arrays of the second and third radiating elements. Preferably, the array of the second radiating elements is a MB array (1400-2200 MHz) and the at least one further array of the third radiating elements is a HB array (1690-2690 MHz).

In a further implementation form of the aspect, the third radiating elements disposed in the area covered by the sparse array are arranged interleaved with the first radiating elements.

This enables integrating the two arrays without loss of antenna performance.

In a further implementation form of the aspect, the third radiating elements are arranged along the longitudinal direction of the antenna in two columns separated along the lateral direction of the antenna, each column at least partially overlapping with the sparse array.

These column-like arrays provides for the best performance.

In a further implementation form of the aspect, the two columns of the third radiating elements are arranged on opposite sides of the array of the second radiating elements so that the array of the second radiating elements is arranged between the two columns.

As mentioned above, preferably the array of the second radiating elements is a MB array and the further array of the third radiating elements is a HB array. In this case, since HB and MB frequency bands are not multiple of each other, the spaces between the second and third radiating elements in their respective columns do not form a regular grid, when the three columns are arranged side-by-side in the above manner. This improves the overall antenna performance.

In a further implementation form of the aspect, a spacing of the third radiating elements disposed in the area covered by the sparse array is uniform.

The uniform spacing of the third radiating elements can be increased, when compared to, e.g. a side-by-side placement of the two arrays, namely by the use of the sparse array integrating with the array of the third radiating elements. Thus, the performance of this array is improved.

In a further implementation form of the aspect, a spacing of the first radiating elements in columns overlapping with the at least one further array of the third radiating elements is non-uniform, and the non-uniform spacing of the first radiating elements in the columns overlapping with the array of the second radiating elements is different than the non-uniform spacing of the first radiating elements in the columns overlapping with the at least one further array of the third radiating elements.

In this way, the sparse antenna array is optimized for optimally integrating the further arrays of the second and third radiating elements, respectively.

In a further implementation form of the aspect, the plurality of the third radiating elements includes first-type and second-type third radiating elements, and the first-type third radiating elements are disposed in the area covered by the sparse array and the second-type third radiating elements are disposed outside of the area covered by the sparse array.

For instance, the first-type third radiating elements may be the above-described low profile and/or low shadowing radiating elements referred to as VH dipoles. The second-type third radiating elements may be conventional radiating elements, like mentioned disc dipoles. The use of the different radiating element types provides the correct horizontal beam width.

In a further implementation form of the aspect, the sparse array includes 8 columns, the array of the second radiating elements is arranged partially overlapping with the two center columns, and a first array of third radiating elements is arranged partially overlapping with the two outermost columns of the first radiating elements on one side of the sparse array, and a second array of third radiating elements is arranged partially overlapping with the two outermost columns of the first radiating elements on the opposite side of the sparse array.

This exemplary antenna provides a side-by-side combination of HB-MB-HB arrays and an interleaved sparse array configuration for the mMIMO. The exemplary antenna shows an optimized performance. Nevertheless, the dimensions of this antenna do not exceed a width (lateral direction) of 390 mm, a length (longitudinal direction) of 1500 mm, and a depth (bore sight direction perpendicular to the other directions) of 50 mm. The antenna also allows having 2×4T4R (1.8G and 2.6G)+2T2R (2.1G)+L-Band support and a full 64 TRX mMIMO functionality.

In a further implementation form of the first aspect, the antenna is configured for multiband operation in the different frequency bands, for which the different radiating elements are configured.

BRIEF DESCRIPTION OF DRAWINGS

The above described aspects and implementation forms of the present disclosures will be explained in the following description of embodiments in relation to the enclosed drawings, in which.

DETAILED DESCRIPTION OF EMBODIMENTS

Figure 1:
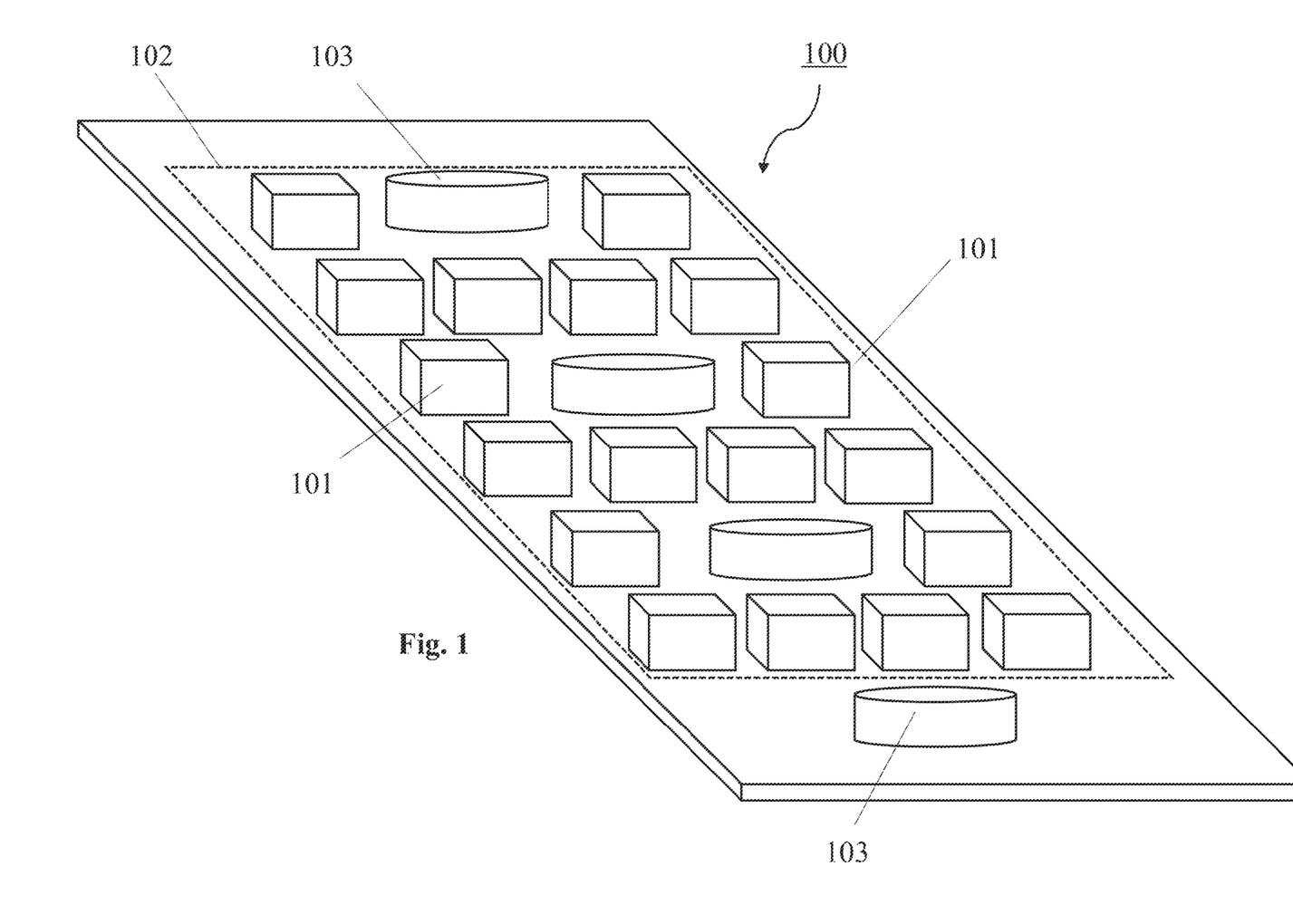
FIG. 1 shows an antenna according to an embodiment of the disclosure with a mMIMO array and one further array.

FIG. 1 illustrates an antenna 100 according to an embodiment of the disclosure. The antenna 100 of FIG. 1 is configured to operate in at least two frequency bands, i.e. it is a multiband antenna. To this end, it has at least two antenna arrays, each antenna array including a plurality of radiating (antenna) elements.

In particular, the antenna 100 includes a plurality of first radiating elements 101, which are configured to radiate in a first frequency band. Further, the antenna 100 includes a plurality of second radiating elements 103, which are different (e.g. type, size) from the first radiating elements 101 and are configured to radiate in a second frequency band lower than the first frequency band. The second frequency band is thereby preferably distinct from the first frequency band. However, it is also possible that the second frequency band partially overlaps with the first frequency band.

The first radiating elements 101 are arranged in a sparse mMIMO array 102, which covers a certain area on the antenna 100. Preferably, the sparse array 102 is arranged such on the antenna 100 that at least 70%, more preferably at least 85% of the area covered by the sparse array 102 are located in the center area of the antenna 100. However, also the complete sparse array 102 may be arranged in the center area of the antenna 100.

The second radiating elements 103 are arranged in a further array, which at least partially overlaps with the sparse array 102. Since at least a part of the further array of the second radiating elements 103 overlaps with the sparse array 102, at least some of the second radiating elements 103 are disposed in the area that is covered by the sparse array 102. The use of the sparse array 102 instead of a conventional non-sparse array for the mMIMO functionality provides available space for integrating the further array, while not compromising on the dimensions of the antenna 100 as a whole. The second radiating elements 103 may be arranged in a regular array, for instance, in a column or in a plurality of rows and columns. However, they may also be disposed in an irregular manner to some extent, as long as they are partly within the sparse array 102.

The first radiating elements 101 of the mMIMO array 102 preferably radiate in the first frequency band being between 3300-3800 MHz. The second radiating elements 103 may either be HB radiating elements or MB radiating elements. Preferably, if the second radiating elements 103 are HB radiating elements, they are configured to radiate in the second frequency band being 1690-2690 MHz. If the second radiating elements 103 are MB radiating elements, they are preferably configured to radiate in the second frequency band being 1400-2200 MHz.

Accordingly, the antenna 100 shown in FIG. 1 is configured to integrate a further array, preferably a passive antenna array formed by the second radiating elements 103, with the mMIMO array 102.

Figure 2:
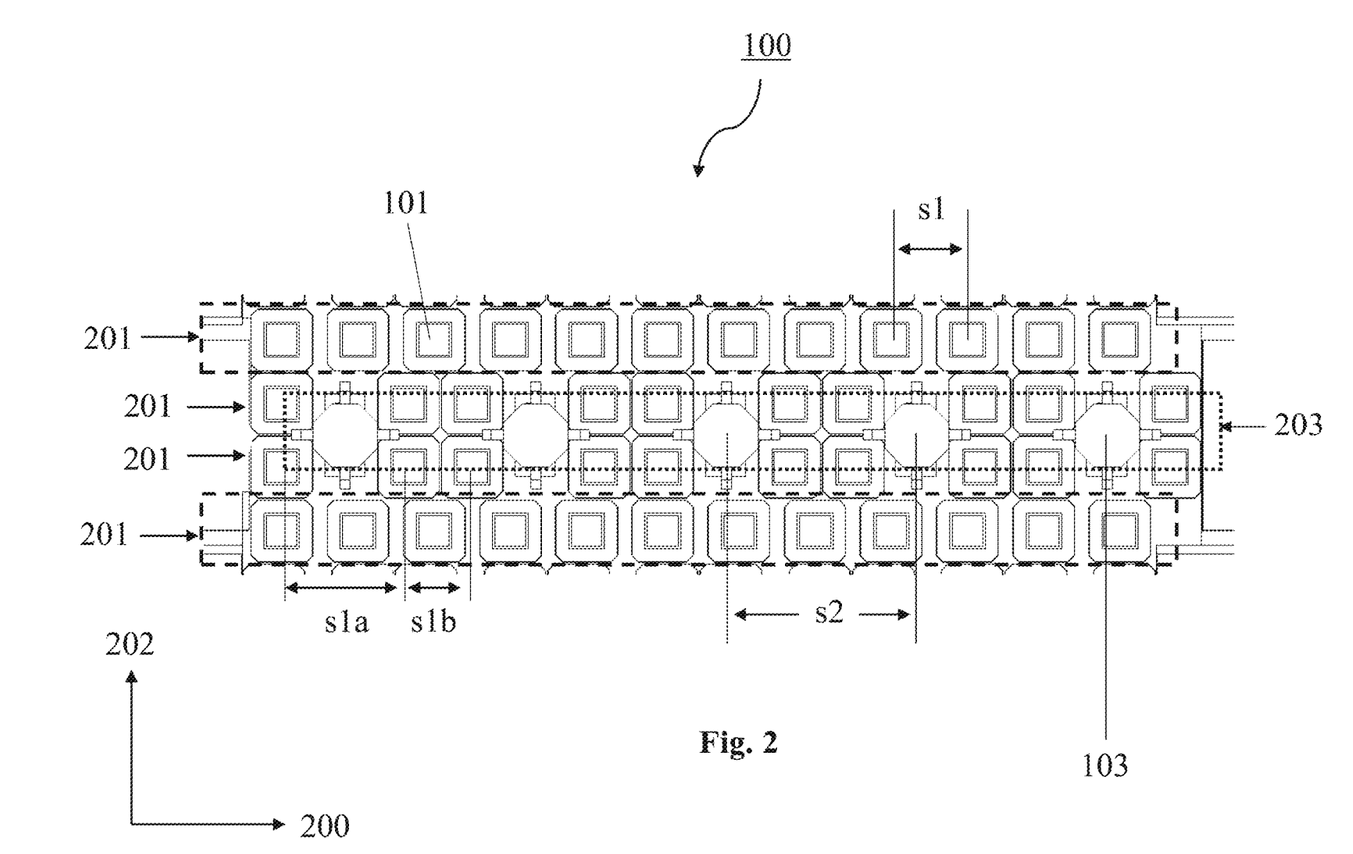
FIG. 2 shows an antenna according to an embodiment of the disclosure with a mMIMO array and one further array.

FIG. 2 shows an antenna 100 according to an embodiment of the present disclosure, which builds on the antenna 100 shown in FIG. 1. The antenna 100 again includes the first radiating elements 101 arranged in the sparse array 102, and the second radiating elements 103 arranged in the further array at least partially overlapping with the sparse array 102. In particular, as shown in FIG. 2 the first radiating elements 101 of the sparse array 102 are preferably arranged along the longitudinal direction 200 of the antenna 100 in a plurality of columns 201, which are separated along the lateral direction 202 of the antenna 100. That is, the sparse array 102 preferably includes first radiating elements 101 disposed in a plurality of side-by-side columns 201. Here in FIG. 2, four side-by-side columns 201 are exemplarily shown for the sparse array 102.

Further, as also shown in FIG. 2 the second radiating elements 103 are preferably arranged along the longitudinal direction 200 of the antenna 100 in a column 203 at least partially overlapping with the sparse array 102. Here in FIG. 2, one column 203 is exemplarily shown overlapping with the sparse array 102. That is, at least some of the second radiating elements 103 arranged in the column 203 are disposed within the area covered by the sparse array 102. Preferably, the second radiating elements 103 are thereby arranged interleaved with the first radiating elements 101 in the area covered by the sparse array 102, i.e. there is at least one first radiating element 101 between each of the overlapping second radiating elements 103. As shown in FIG. 2, the second radiating elements 103 are thereby preferably disposed with a uniform spacing s2.

Further, it can be seen in FIG. 2 that at least one of the columns 201 of the first radiating elements 101 includes less first radiating elements 101 than the other columns 201 of the first radiating elements 101. In particular, for the example of the four columns 201 shown in FIG. 2, the two outermost columns 201 on opposite sides of the sparse array 102 include 12 first radiating elements 101, while the two central columns 201 of the sparse array 102 include only 10 first radiating elements 101.

Thereby, at least in one of the columns 201 of the first radiating elements 101, a spacing of the first radiating elements 101 is non-uniform. In FIG. 2, this is exemplarily the case in the two central columns 201, in which some adjacent first radiating elements 101 are separated by a smaller spacing $s1b$ and other adjacent first radiating elements 101 are separated by a larger spacing $s1a$. In the larger spacings $s1a$ of the first radiating elements 101, the second radiating elements 103 are preferably arranged, i.e. they are arranged in the available space provided by the use of the sparse array 102. A spacing in other columns 201 of the first radiating elements 101, in particular those columns 201 that do not overlap with any second radiating elements 103, may be uniform. For instance, in FIG. 2 the two outermost columns 201 have a uniform spacing s1. Preferably the uniform spacing s1 is larger than the smaller spacing $s1b$ but smaller than the larger spacing $s1a$.

Figure 3:
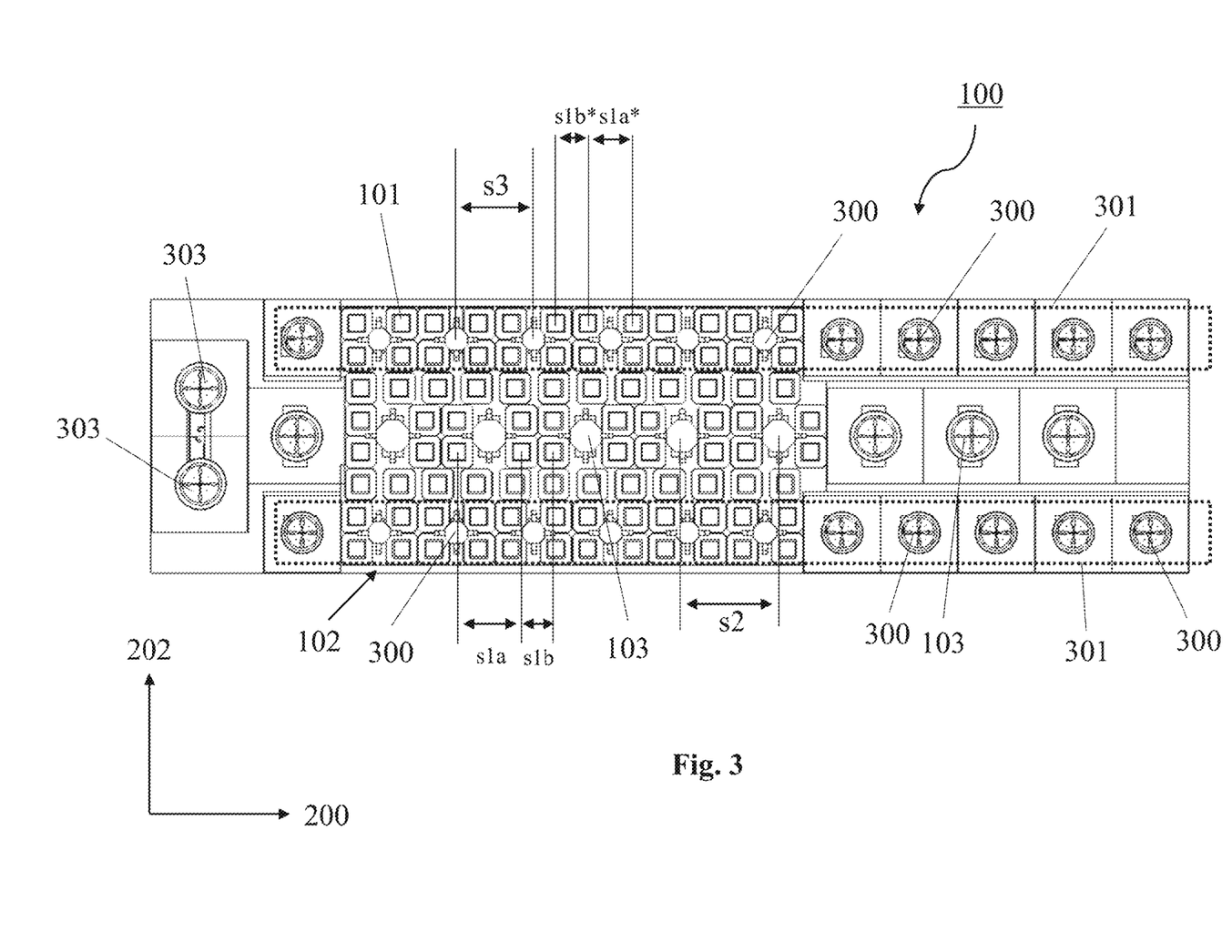
FIG. 3 shows an antenna according to an embodiment of the disclosure with a mMIMO array and two further arrays.

FIG. 3 shows an antenna 100 according to an embodiment of the present disclosure, which builds on the antennas 100 of FIGS. 1 and 2. In particular, the antenna 100 of FIG. 3 includes the first radiating elements 101 in the sparse array 102, includes the second radiating elements 103 in a column-like further array, and additionally includes third radiating elements 300. As shown in FIG. 3, the third radiating elements 300 are preferably arranged along the longitudinal direction 200 of the antenna 100 in two columns 301. These columns 301 are separated along the lateral direction 202 of the antenna 100. Like for the second radiating elements 103, both columns 301 of the third radiating elements 300 at least partially overlap with the sparse array 102. That is, at least some of the third radiating elements 300 of each column 301 shown in FIG. 3 are disposed in the area covered by the sparse array 102.

In FIG. 3 the two columns 301 of the third radiating elements 300 are specifically arranged on opposite sides of the column-like array of the second radiating elements 103. Accordingly, the array of the second radiating elements 103 is preferably arranged between the two columns 301 of the third radiating elements 300. It can also be seen in FIG. 3 that the column-like array of the second radiating elements 103 is divided into two second radiating elements 303 on one of its ends. These two radiating elements 303 are arranged such that they are positioned identically with respect to the longitudinal direction of the antenna 100, but are separated along the lateral direction 202 of the antenna 100. These radiating elements 303 lead to a narrower horizontal beam width of the array of complete array of third radiating elements 103, 303.

In FIG. 3, it can also be seen that the spacing s2 of the second radiating elements 103 and a spacing s3 of the third radiating elements 300, respectively, is uniform. In particular, both inside and outside the area covered by the sparse array 102. In the sparse array 102, columns 201 of first radiating elements 101, which are overlapping with the second radiating elements 103 or with the third radiating elements 300, respectively, are non-uniform. Furthermore, the non-uniformity of the spacing of the first radiating elements 101 in columns 201, which are overlapping with the second radiating elements 103, is different than the non-uniformity of the spacing of the first radiating elements 101 in columns 201, which are overlapping with the third radiating elements 300. In particular, the smaller spacings s1b, s1b* and/or larger spacings s1a, s1a* may differ between these columns 201 depending on whether they overlap with the second radiating elements 103 or the third radiating elements 300.

Preferably, the antenna 100 is a multi-band antenna configured to radiate in two HBs having a frequency range of preferably 1690-2690 MHz, one MB having a frequency range of preferably 1427-2200 MHz and a mMIMO band having a frequency range of preferably 3300-3800 MHz. Thus, preferably the array of the second radiating elements 103 is a MB array, and the columns 301 of the third radiating elements 300 are HB arrays.

Figure 4:
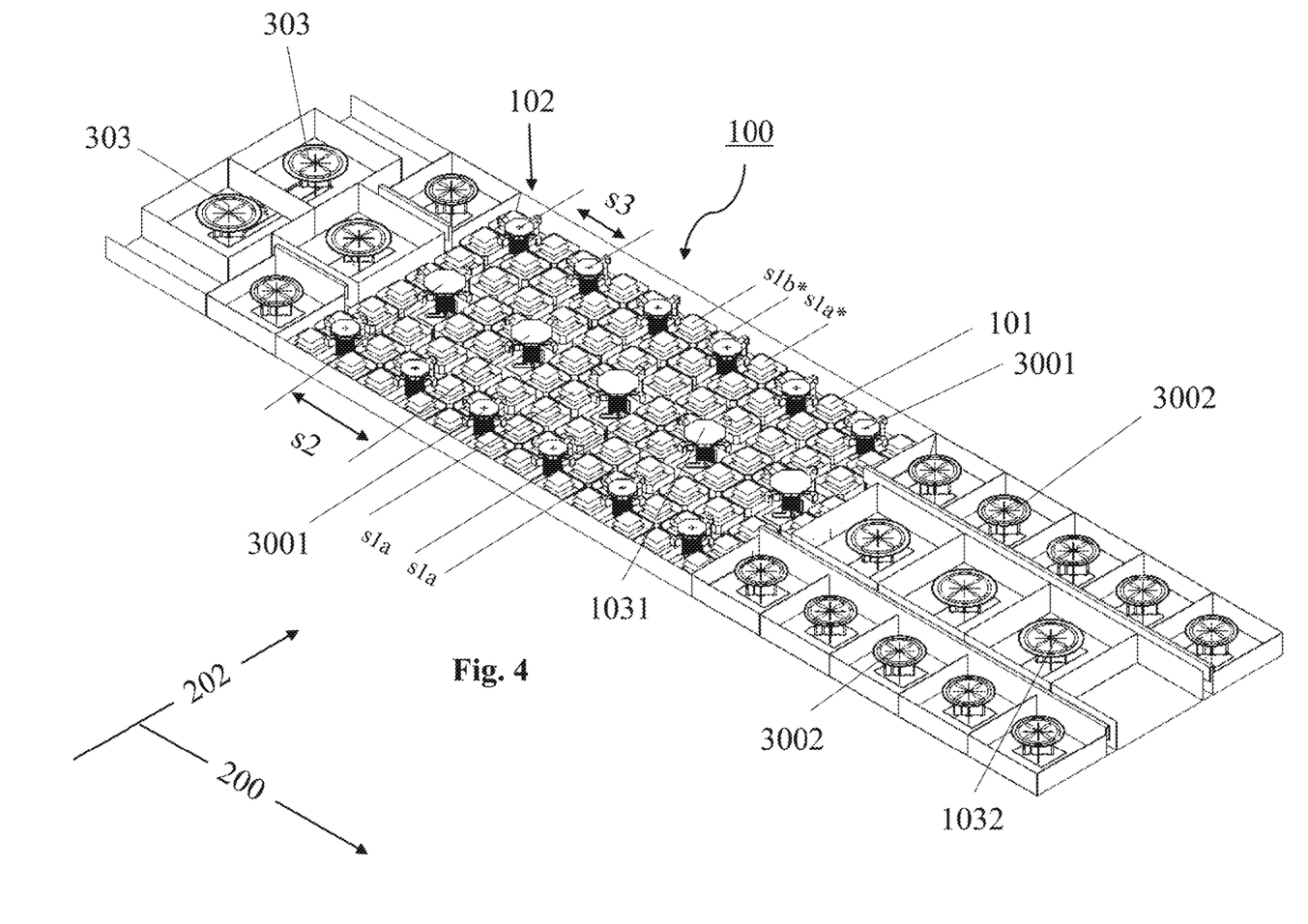
FIG. 4 shows an antenna according to an embodiment of the disclosure with a mMIMO array and two further arrays.

FIG. 4 shows an antenna 100 according to an embodiment of the present disclosure, which builds on the antenna 100 shown in FIG. 3. FIG. 4 shows actually the same antenna 100 as in FIG. 3, but in a perspective view. It can be seen that both the second radiating elements 103 and the third radiating elements 300 include first-type and second-type radiating elements. In particular, the second radiating elements 103 include first-type second radiating elements 1031 and second-type second radiating elements 1032. The first-type second radiating elements 1031 are arranged overlapping with the sparse array 102, i.e. they are preferably interleaved with the first radiating elements 101, whereas the second-type second radiating elements 1032 are arranged outside of the sparse array 102, i.e. preferably on outer areas of the antenna 100. Likewise for the third radiating elements 300, the first-type third radiating elements 3001 are disposed preferably interleaved with the first radiating elements 101 in the area covered by the sparse array 102, and the second-type third radiating elements 3002 are disposed outside of the sparse array 102.

Figure 7:
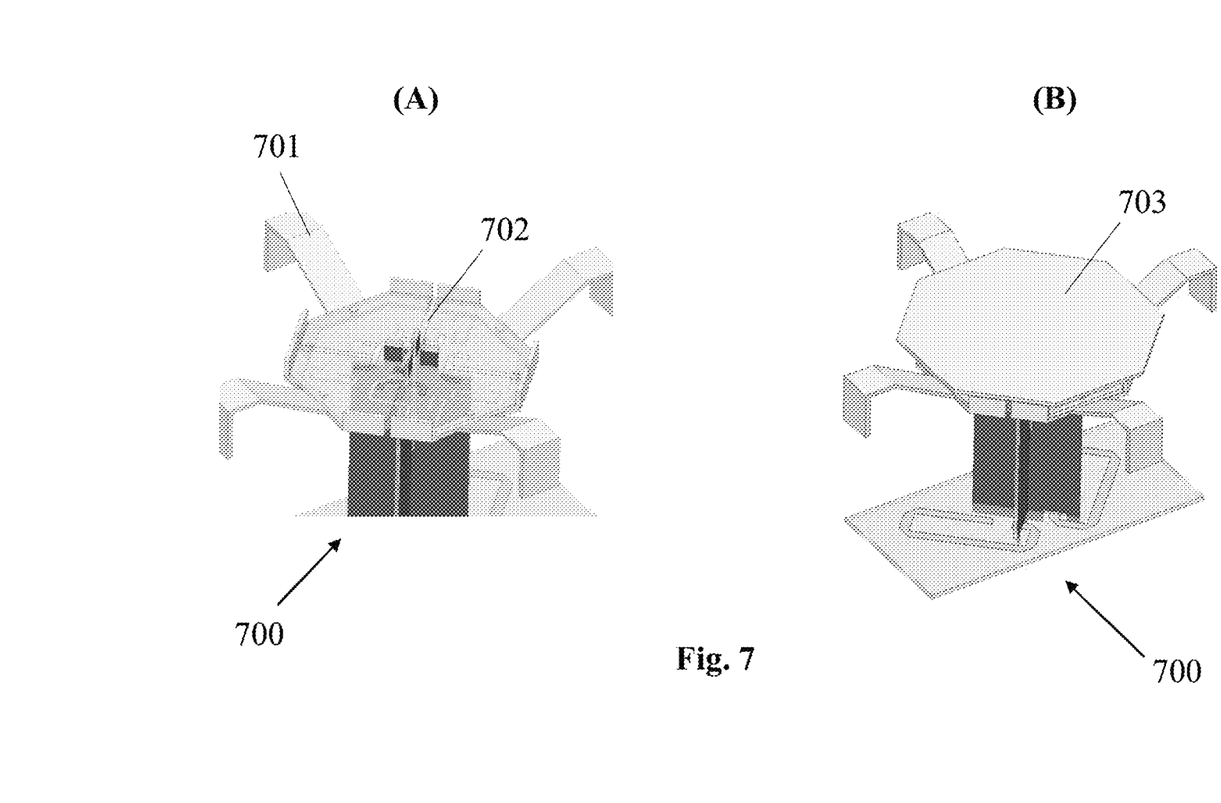
FIG. 7 shows radiating elements for interleaved placement in an antenna according to an embodiment of the disclosure with a sparse mMIMO array.

The first-type second radiating elements 1031 and/or the first-type third radiating elements 3001 may be designed particularly for sharing the area with the first radiating elements 101 of the mMIMO sparse array 102. Preferably, they are thus low shadowing radiating elements, with preferably a low profile. These so called VH (Vertical Horizontal) diploes have the great advantage of significantly reducing if not eliminating the shadowing over the mMIMO array 102, namely by not filling the space directly over the mMIMO first radiating elements 101. In particular, as shown in FIG. 7 in (A), such low profile VH dipoles 700 may be dual-polarized radiating elements comprising four dipole arms 701 and four feeding slots 702, wherein the dual-polarization of the radiation is defined by the slots 702. Preferably, the four dipole arms 701 are arranged in an angular arrangement, like in 90° intervals, and the radiating slots 702 are arranged in a second angular arrangement, for instance also in 90° intervals. The first angular arrangement and the second angular arrangement are rotated with respect to each other, preferably by 45°. In FIG. 7 in (B) is shown that these VH dipoles 700 may further include a parasitic director 703 on top. Such VH dipoles 700 can be built with a very low profile, and can be integrated as the second radiating elements 103 and/or the third radiating elements 300 into the array of the first radiating elements 101, where they cause only very low shadowing on the sparse array 102.

The second-type second radiating elements 1032 and/or the second-type third radiating elements 3002 may be conventional, for instance, disc-shaped dipoles, and can have a larger profile than the VH dipoles, since they do not need to share any area with the sparse array 102.

It can again be seen in FIG. 4 that the array of second radiating elements 1031 and 1032, preferably a MB array, is divided at its one end including two second radiating elements 303, in order to produce a combine radiation pattern with thinner horizontal beam width. When the full array of the second radiating elements 103 and 303 are excited, the total horizontal beam width is reduced.

In particular, the sparse array 102 shown in FIG. 4 includes 8 columns 201. Preferably, these 8 columns are spaced along the lateral direction 202 of the antenna 100 by about 40-50 mm, most preferably by 46 mm. All columns 201 have preferably a certain number (here 12) of first radiating elements 101, except the two central columns, which have preferably less (here only 10) first radiating elements 103. The array of a second radiating elements 103 is arranged partially overlapping with these two center columns 201.

The 8 columns of the sparse array 102 have also different spacings, particularly different smaller and larger spacings s1b, s1b* and s1a, s1a* of the first radiating elements 101. The spacing in the two outermost columns on either side is preferably 40-50 mm, more preferably 46 mm for the smaller spacing s1b*, and is preferably 60-70 mm, more preferably 64 mm for the larger spacing s1a*, respectively. In the two central columns, the smaller spacing s1b is preferably 40-50 mm, more preferably 46 mm, and the larger spacing s1a is preferably 85-100 mm, more preferably 92 mm. The remaining columns have preferably a uniform spacing of preferably 50-60 mm, more preferably 55 mm, between the first radiating elements 101. With respect to the two center columns 201, the sparse array 102 is preferably symmetrical in the lateral direction 202 of the antenna 100.

Further, as shown in FIG. 4, the first array of third radiating elements 300 is arranged partially overlapping with the two outermost columns 201 on one side of the sparse array 102, and the second array of third radiating elements 300 is arranged partially overlapping with the two outermost columns 201 of the first radiating elements 101 on the opposite side of the sparse array 102. Both arrays of third radiating elements 300 are preferably columns with a uniform spacing s3.

Figure 5:
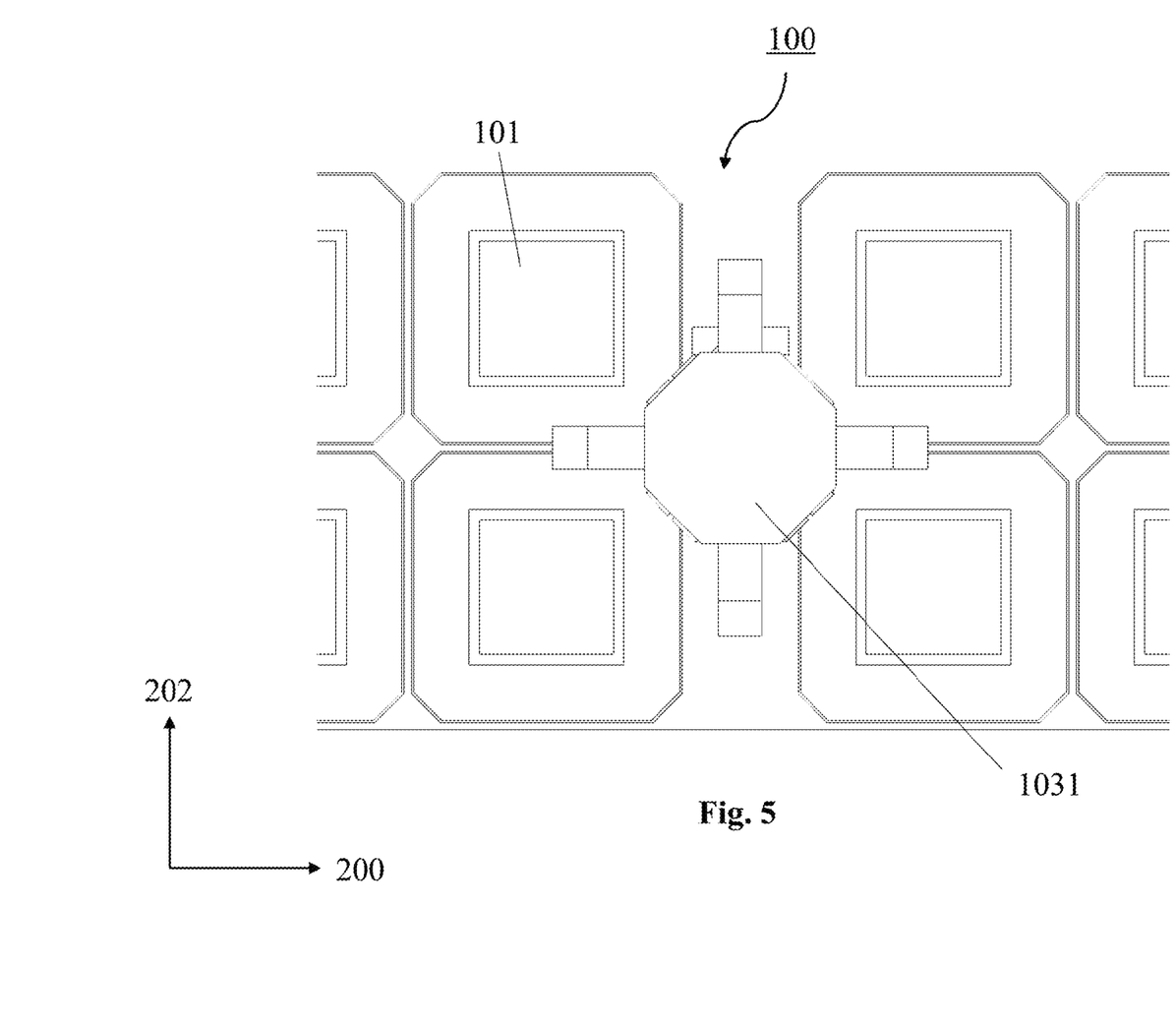
FIG. 5 shows a section of an antenna according to an embodiment of the disclosure with a mMIMO array and at least one further array.

FIG. 5 shows a top-view of a section on an antenna 100 according to an embodiment of the present disclosure, which builds on the antennas 100 shown in the previous figures. In particular, a second radiating element 103 is exemplarily shown, especially a first-type second radiating element 1031, which is disposed within the area covered by the sparse array 102, i.e. is arranged between first radiating elements 101. It can be seen how the use of a VH dipole (as shown in detail in FIG. 7) can be used to create a minimal shadowing over the first radiating elements 101 of the mMIMO sparse array 102.

Figure 6:
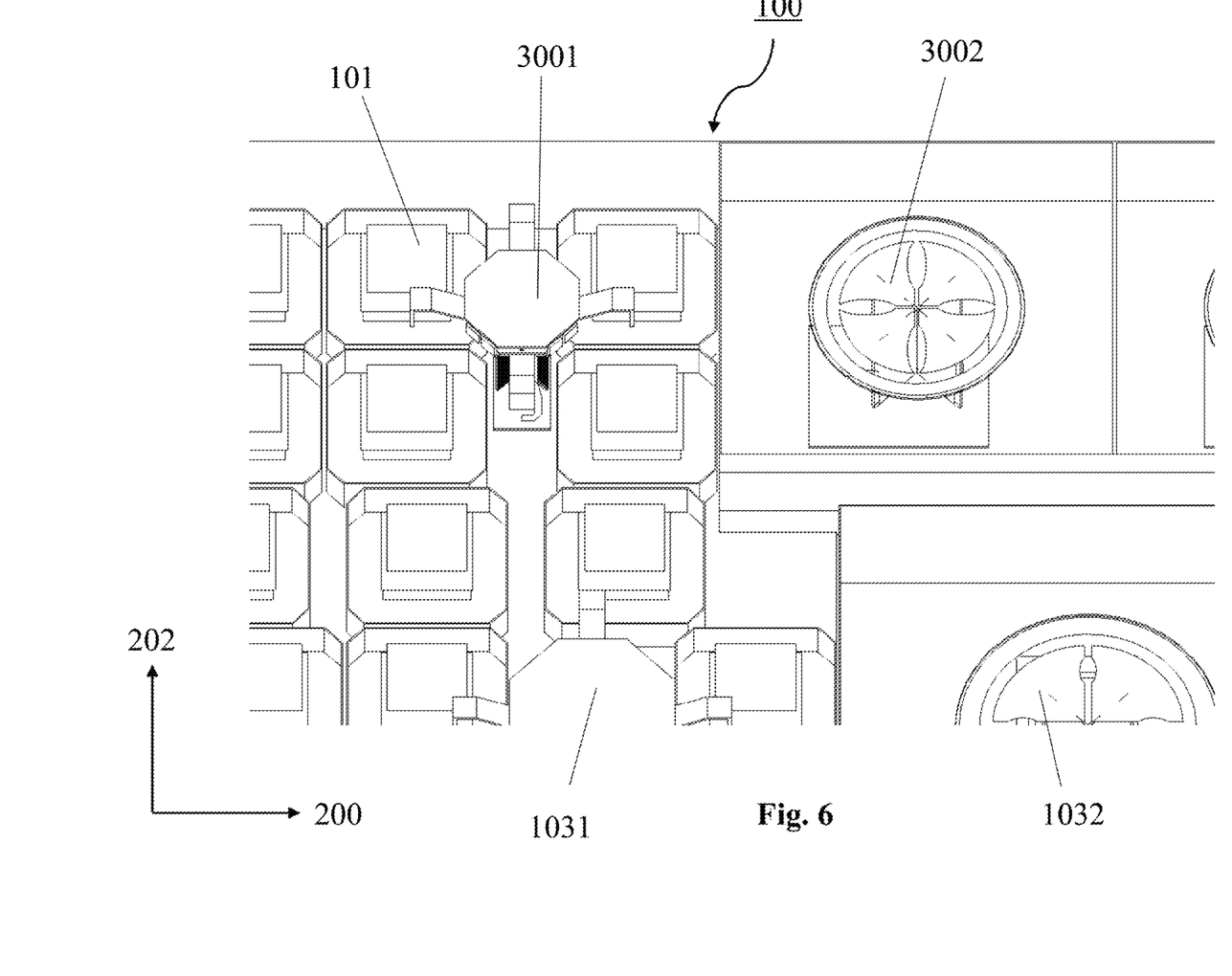
FIG. 6 shows a section of an antenna according to an embodiment of the disclosure with a mMIMO array and two further arrays.

FIG. 6 shows a zoom in into a section of the antenna 100 according to an embodiment of the present disclosure, which builds on the antennas 100 shown in the previous figures. In particular, FIG. 6 shows two third radiating elements 300, particularly a first-type third radiating element 3001 and a second-type radiating elements 3002 disposed within and outside of the area covered by the sparse array 102, respectively. It can be seen that the first-type third radiating elements 3001 may be again the VH dipole 700 shown in FIG. 7 to create low shadowing on the sparse array 102. The second-type third radiating elements 3002 may be a conventional disc-shaped or ring-shaped dipole, and may be larger in size and profile than the VH dipole 700, since it anyhow does not provide any shadowing over the sparse array 102. FIG. 6 also shows that the same selection is preferably true for the first-type second radiating elements 1031 and the second-type second radiating elements 1032.

Figure 8:
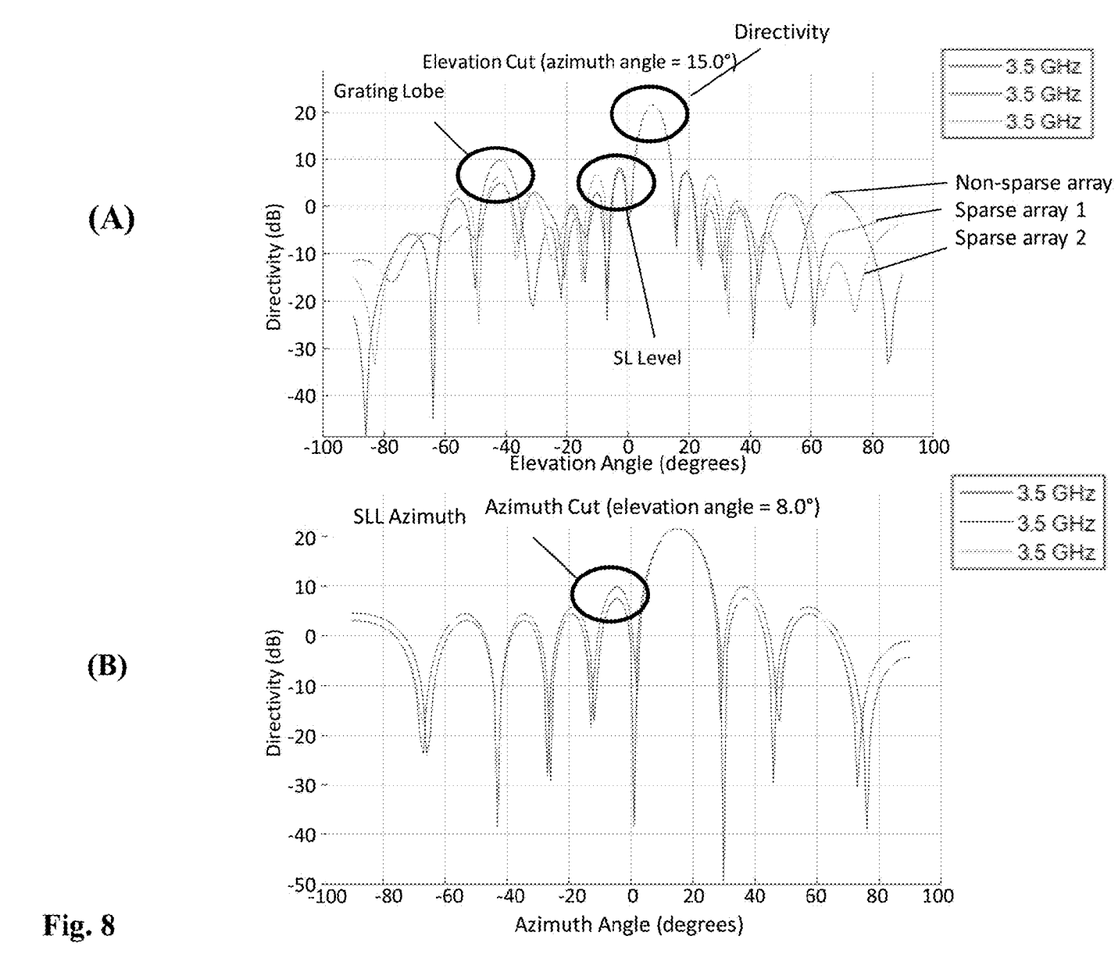
FIG. 8 shows a comparison of grating lobe and SLL azimuth of an antenna according to an embodiment of the disclosure with a conventional antenna.

FIG. 8 shows a performance comparison between antennas 100 according to embodiments of the present disclosure and a regular mMIMO antenna. In particular, FIG. 8 shows a comparison for measurements of the grating lobe, the SLL and the directivity (in (A)) and of the SLL azimuth (in (B)) between a mMIMO sparse array 102 used in an antenna 100 and a comparable non-sparse mMIMO array as used in a conventional antenna. In particular, two different sparse arrays 102 with different configurations are compared with the conventional non-sparse array. It can be seen that the performance of the sparse arrays 102 is at least the same than the performance of the conventional non-sparse mMIMO array. Specifically, directivity is very similar, SLL is only slightly decreased (by 2.5 dBs), while grating lobe performance is even increased (by 4-5 dBs) for the antenna 100 of the present disclosure with a sparse array 102.

The present disclosure provides a new integrated antenna 100, in which particularly a sparse mMIMO array 102 is provided and designed to optimally integrate with at least one further e.g. passive antenna array. The sparse mMIMO array 102 optimally integrates with both HB and MB radiating elements 300 and 103, respectively. Thus, an antenna 100 with up to three different frequency bands is provided without increasing the dimensions of the antenna 100 over a conventional antenna. The antenna 100 can be constructed with a total maximum width of 93 mm, maximum length of 100 mm, and maximum depth of 50 mm. The antenna 100 thereby shows at least comparable performance than stand-alone HB, MB and mMIMO arrays.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An antenna comprising:
   a plurality of first radiating elements configured to radiate in a first frequency band, the first radiating elements being arranged in a sparse massive Multiple Input Multiple Output (mMIMO) array; and
   a plurality of second radiating elements configured to radiate in a second frequency band lower than the first frequency band, the second radiating elements being arranged in an array at least partially overlapping with the sparse mMIMO array so that at least some of the second radiating elements are disposed in an area covered by the sparse mMIMO array,
   wherein:
   the plurality of the second radiating elements comprises first-type radiating elements and second-type second radiating elements, and
   the first-type second radiating elements are arranged in the area covered by the sparse mMIMO array and the second-type second radiating elements are arranged outside of the area covered by the sparse mMIMO array.

2. The antenna according to claim 1, wherein:
   the sparse mMIMO array comprises the first radiating elements arranged along a longitudinal direction of the antenna in a plurality of columns separated along a lateral direction of the antenna, and
   at least in one of the columns a spacing of the first radiating elements is non-uniform.

3. The antenna according to claim 2, wherein:
   the at least one column with the non-uniform spacing of the first radiating elements comprises adjacent ones of the first radiating elements separated by a smaller spacing than a larger spacing of other adjacent ones of the first radiating elements, and
   at least one of the second radiating elements is arranged in the larger spacing of the first radiating elements.

4. The antenna according to claim 1, wherein at least 70% of the sparse mMIMO array is arranged in a center area of the antenna.

5. The antenna according to claim 1, wherein the second radiating elements disposed in the area covered by the sparse mMIMO array are arranged interleaved with the first radiating elements.

6. The antenna according to claim 1, wherein a spacing of the second radiating elements disposed in the area covered by the sparse mMIMO array is uniform.

7. The antenna according to claim 1, further comprising:
   a plurality of third radiating elements configured to radiate in a third frequency band lower than the first frequency band, wherein the third radiating elements are arranged in at least one further array at least partially overlapping the sparse mMIMO array so that at least some of the third radiating elements are disposed in the area covered by the sparse mMIMO array.

8. The antenna according to claim 7, wherein a spacing of the third radiating elements disposed in the area covered by the sparse mMIMO array is uniform.

9. The antenna according to claim 7, wherein:
the plurality of the third radiating elements includes first-type radiating elements and second-type third radiating elements, and
the first-type third radiating elements are disposed in the area covered by the sparse mMIMO array and the second-type third radiating elements are disposed outside of the area covered by the sparse mMIMO array.

10. The antenna according to claim 7, wherein the third radiating elements disposed in the area covered by the sparse mMIMO array are arranged interleaved with the first radiating elements.

11. The antenna according to claim 7, wherein the third radiating elements are arranged along a longitudinal direction of the antenna in two columns separated along a lateral direction of the antenna, each of the two columns at least partially overlapping with the sparse mMIMO array.

12. The antenna according to claim 11, wherein the two columns of the third radiating elements are arranged on opposite sides of the array of the second radiating elements so that the array of the second radiating elements is arranged between the two columns.

13. An antenna comprising:
a plurality of first radiating elements configured to radiate in a first frequency band, the first radiating elements being arranged in a sparse massive Multiple Input Multiple Output (mMIMO) array; and
a plurality of second radiating elements configured to radiate in a second frequency band lower than the first frequency band, the second radiating elements being arranged in an array at least partially overlapping with the sparse mMIMO array so that at least some of the second radiating elements are disposed in an area covered by the sparse mMIMO array,
wherein:
the sparse mMIMO array comprises the first radiating elements arranged along a longitudinal direction of the antenna in a plurality of columns separated along a lateral direction of the antenna, and
at least one of the plurality of columns of the first radiating elements comprises fewer of the first radiating elements than other columns of the first radiating elements.

14. The antenna according to claim 13, wherein:
a spacing of the first radiating elements in columns overlapping with the array of the second radiating elements is non-uniform, and/or
a spacing of the first radiating elements in columns not overlapping with the array of the second radiating elements is uniform.

15. The antenna according to claim 14, wherein:
a spacing of the first radiating elements in columns overlapping with the at least one further array of the third radiating elements is non-uniform, and
the non-uniform spacing of the first radiating elements in the columns overlapping with the array of the second radiating elements is different than the non-uniform spacing of the first radiating elements in the columns overlapping with the at least one further array of the third radiating elements.

16. The antenna according to claim 13, wherein:
the sparse array comprises 8 columns,
the array of the second radiating elements is arranged partially overlapping with two center columns, and
a first array of third radiating elements is arranged partially overlapping with two outermost columns of the first radiating elements on one side of the sparse mMIMO array, and a second array of third radiating elements is arranged partially overlapping with the two outermost columns of the first radiating elements on an opposite side of the sparse mMIMO array.

17. An antenna comprising:
a plurality of first radiating elements configured to radiate in a first frequency band, the first radiating elements being arranged in a sparse massive Multiple Input Multiple Output (mMIMO) array; and
a plurality of second radiating elements configured to radiate in a second frequency band lower than the first frequency band, the second radiating elements being arranged in an array at least partially overlapping with the sparse mMIMO array so that at least some of the second radiating elements are disposed in an area covered by the sparse mMIMO array,
wherein the second radiating elements are arranged along a longitudinal direction of the antenna in a column at least partially overlapping with the sparse mMIMO array.

18. The antenna according to claim 17, wherein the column of the second radiating elements is divided into two second radiating elements on at least one position, the two second radiating elements being arranged at the same position with respect to a longitudinal direction of the antenna but are separated along a lateral direction of the antenna.

19. The antenna according to claim 18, wherein the column of the second radiating elements is divided into two second radiating elements on at least one of its ends.

* * * * *

UNITED STATES PATENT AND TRADEMARK OFFICE
CERTIFICATE OF CORRECTION

| | | |
|---|---|---|
| PATENT NO. | : 11,456,544 B2 | Page 1 of 1 |
| APPLICATION NO. | : 16/817140 | |
| DATED | : September 27, 2022 | |
| INVENTOR(S) | : Gonzalez et al. | |

It is certified that error appears in the above-identified patent and that said Letters Patent is hereby corrected as shown below:

On the Title Page

Page 2: Item (56) U.S. Patent Documents: -- 6,211,841 B1 4/2001 Smith et al. -- and -- 2014/0066757 A1 3/2014 Chayat -- should be listed as references.

Page 2: Item (56) Foreign Patent Documents: -- CN 1254966 A 5/2000 --, -- KR 20110088177 A 8/2011 --, and -- CN 205016680 U 2/2016 -- should be listed as references.

Signed and Sealed this
Thirty-first Day of January, 2023

Katherine Kelly Vidal
*Director of the United States Patent and Trademark Office*